United States Patent
Erickson et al.

(10) Patent No.: US 6,687,553 B2
(45) Date of Patent: Feb. 3, 2004

(54) DUAL GAIN VARIABLE CONTROL SYSTEM

(75) Inventors: Bradley C. Erickson, Clarkston, MI (US); Garrett R. Holmes, Ortonville, MI (US); Steven J. Roskowski, Farmington Hills, MI (US)

(73) Assignee: BorgWarner Inc., Auburn Hills, MI (US)

( * ) Notice: Subject to any disclaimer, the term of this patent is extended or adjusted under 35 U.S.C. 154(b) by 275 days.

(21) Appl. No.: 09/884,189

(22) Filed: Jun. 19, 2001

(65) Prior Publication Data

US 2002/0017624 A1 Feb. 14, 2002

Related U.S. Application Data

(60) Provisional application No. 60/215,858, filed on Jun. 29, 2000.

(51) Int. Cl.$^7$ .............................................. G05B 13/02
(52) U.S. Cl. .......................... 700/37; 700/32; 700/41; 700/42; 700/43; 251/129.01; 251/129.09; 251/129.15; 361/195; 361/206; 137/315.03
(58) Field of Search ............................. 700/28, 32, 37, 700/41, 42, 43; 251/129.1, 129.09, 129.15, 129.08, 129.17; 361/160–161, 195, 183, 206; 137/315.03; 310/14, 23, 30, 34, 35

(56) References Cited

U.S. PATENT DOCUMENTS

| | | | |
|---|---|---|---|
| 1,700,029 A | | 1/1929 | Dady et al. |
| 3,585,902 A | * | 6/1971 | Anderson ................... 91/363 A |
| 4,050,085 A | * | 9/1977 | Prince et al. ............. 348/217.1 |
| 4,065,096 A | | 12/1977 | Frantz et al. |
| 4,201,116 A | * | 5/1980 | Martin ......................... 91/387 |
| 4,948,093 A | | 8/1990 | Sugawara et al. |
| 5,108,070 A | | 4/1992 | Tominaga |
| 5,208,483 A | * | 5/1993 | Reneau ....................... 307/10.1 |
| 5,328,150 A | | 7/1994 | Guativa |
| 5,441,232 A | | 8/1995 | Tanaka |
| 5,603,244 A | * | 2/1997 | Tischer ....................... 74/500.5 |
| 5,628,296 A | * | 5/1997 | Herrington et al. .... 123/568.21 |
| 5,899,436 A | | 5/1999 | Holmes et al. |

FOREIGN PATENT DOCUMENTS

| | | | | |
|---|---|---|---|---|
| DE | 10131679 A1 | * | 6/2000 | ............. H01F/7/18 |
| JP | 03125087 A | * | 5/1991 | ............ F16K/31/06 |

* cited by examiner

*Primary Examiner*—Ramesh Patel
(74) *Attorney, Agent, or Firm*—Warn, Burgess & Hoffmann, P.C.

(57) ABSTRACT

A method for controlling a solenoid using a single coil solenoid for both course and fine adjustment. A resistor or series of resistors may be used in parallel/for current controlled solenoids or in series for voltage controlled solenoids for allowing course or finite control of the solenoids.

11 Claims, 3 Drawing Sheets

DUAL GAIN VARIABLE CONTROL SYSTEM

This application claims the priority based on U.S. Provisional Application No. 60/215,858, filed Jun. 29, 2000, under 35 U.S.C. 119(e).

BACKGROUND OF THE INVENTION

The present invention relates to a clutch control system for finite control of a clutch system. More particularly, the present invention relates to a dual gain variable control system for solenoid control of a clutch actuator.

Solenoid control for actuation of drive clutches is known. In control of these clutches, it is desirable to have finite control over certain operational conditions. For instance, a vehicle, when operating in second gear, is under operating conditions wherein there is a lot of torque in the engine and drive train and not much speed of the vehicle. Under these conditions, it is desirable to have higher clamping forces (or fuller engagement of the clutch) and less solenoid finite control is necessary. Whereas, if the vehicle is in $6^{th}$ gear, it has a lot of speed, but low torque in the engine and drive train. Under these conditions, lower clamping force is necessary and higher finite solenoid control is desired.

Thus, it is desirable in transmission control applications to provide finite resolution at low control pressure while maintaining the capacity to provide high control pressures under certain conditions. Thus, a variable force solenoid pressurizing a clutch requires care in modulating low pressure engagement, while allowing for higher clamping forces to be ramped up fairly quickly once the required engagement force has been attained. Additionally, even higher control pressure may be desired for achieving higher clamping force such as in reverse gear.

In the past, one solution was to use a dual gain solenoid with individually wound coils, such as that shown in U.S. Pat. No. 5,899,436, issued May 4, 1999 to Holmes. While such a construction allows variable control of a clutch unit, the solenoid and control systems used are expensive to manufacture and use. Therefore, it is desirable to provide a substitute solution for providing control of a solenoid.

SUMMARY OF THE INVENTION

The present invention provides a method of controlling a proportional solenoid having a single control. The method comprises providing a control signal having a predetermined number of controlled stepped levels. Thereafter, a full gain range is provided, which is between a minimum gain and a maximum gain, for selectively powering the solenoid at any one of the preset gain levels within the full gain range. In the subject invention, the full gain range is selectively reduced to a partial gain range for selectively powering the solenoid. Thereafter, a full gain range is selected in a first mode, or a partial gain range is selected in a second mode, and a power signal is produced to the coil, based on the control signal. The power signal can be either one of the preset number of gain levels in the full range in the first mode, or one of the preset gains in the partial range. This allows the number of preset gains to be the same in the first mode and in the second mode, so that gain levels in the second mode provide a higher resolution than in the first mode.

Further understanding of the present invention will be had when the drawings are reviewed with reference to the specification below, including the attachments to the specification submitted herewith.

DETAILED DESCRIPTION OF THE PREFERRED EMBODIMENTS

The present invention provides a method of controlling a proportional solenoid having a single control. The method comprises providing a control signal having a predetermined number of controlled stepped levels. Thereafter, a full gain range is provided, which is between a minimum gain and a maximum gain, for selectively powering the solenoid at any one of the present gain levels within the full gain range. In the subject invention, the full gain range is selectively reduced to a partial gain range for selectively powering the solenoid. Thereafter, a full gain range is selected in a first mode, or a partial gain range is selected in a second mode, and a power signal is produced to the coil, based on the control signal. The power signal can be either one of the preset number of gain levels in the full range in the first mode, or one of the preset gains in the partial range. This allows the number of preset gains to be the same in the first mode and in the second mode, so that gain levels in the second mode provide a higher resolution than in the first mode.

Figure 1:
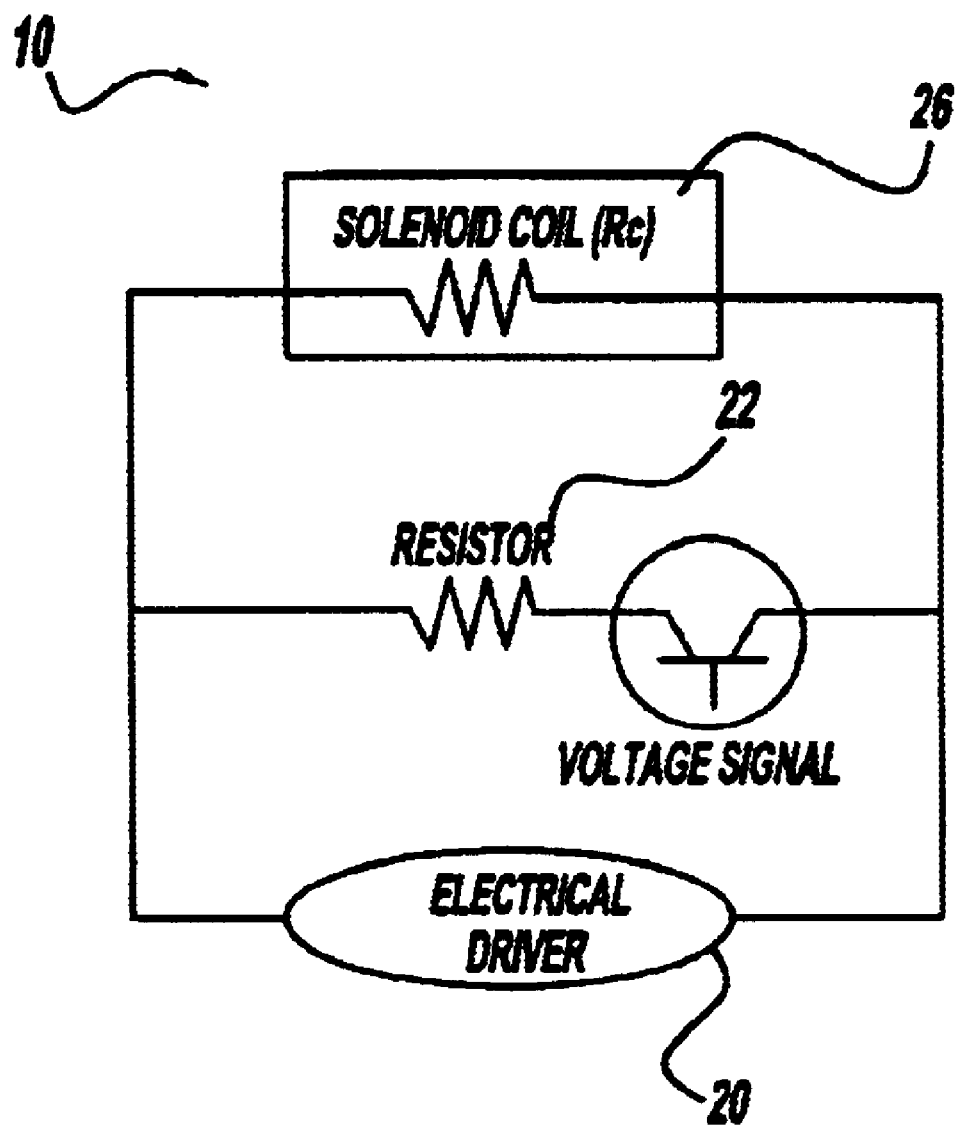
FIG. 1 shows a circuit using a resistor in parallel to bleed off current for finite control of a solenoid.

Referring now to FIG. 1, the present invention uses a single coil solenoid for both finite and course pressure control by the solenoid. With respect to FIG. 1, there is provided a driving circuit 10 which utilizes a resistor in parallel for bleeding part of the current signal from the driver to the coil. In this circuit, a pulse width modulated signal 20 is provided to the solenoid coil $R_c$ with a resistor 22 provided in parallel with the coil. In the present invention, a current voltage divides the drive circuit by way of a resistor. This bleeds current and gives finer current control. For instance, a typical control circuit may have 256 steps spread over 1 amp. If a resistor (or series of resistors) is placed in parallel, the same number of steps can be portioned over 0.5 amps or 0.025 amps, such that greater finite control of the solenoid is possible. This has the effect of increasing the resolution during the low pressure portion of the transfer function by allowing a full 256 steps to be used during the low pressure engagement. When full torque capacity (high pressure) is desired, a signal voltage from the computer causes the transistor to open the part of the circuit containing the parallel resistor ($R_g$) thereby increasing the current to the solenoid. The current applied to the solenoid coil is now the entire driver current. If the entire driver current is not desired, then the driver can simultaneously or soon after be reduced. Note that the time lag to obtain full clutch pressure is only comprised of the time lag required for a transistor to change state and the time lag for the solenoid to react to the changing current. In an alternate embodiment, current steps are typically controlled by an 8 bit controller giving 256 steps. The current steps can be further divided by changing the count generation design to have additional bits (i.e., 12 bit, 16 bit, etc.). Thus, use of a 12 bit count generator would yield 4,096 steps. Such a modification of the controller is accomplished by cascading another counter into series along with the comparator to handle the additional bits. Typical counters which could be used include a CD4516B counter used along with a CD4063B4 bit comparator.

Figure 2:
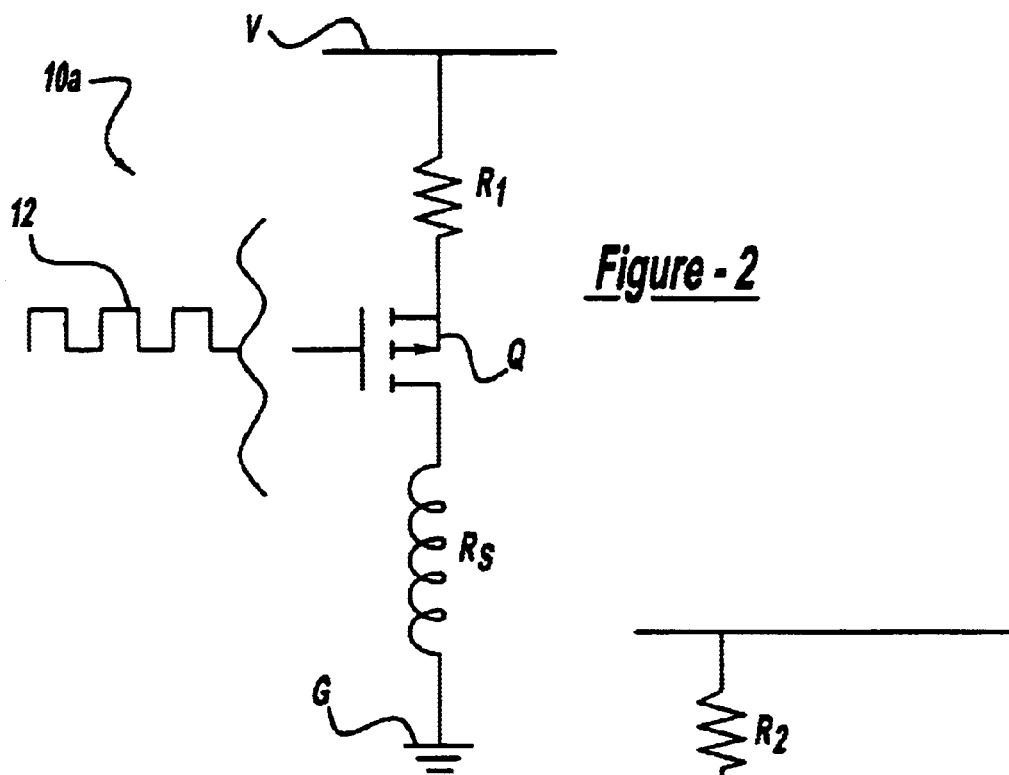
FIG. 2 is a schematic showing a single power driver for a control solenoid using a single resistor in series.

Referring now to FIG. 2, there is provided a simple circuit demonstrating the use of the present invention generally shown at 10a. As set forth therein, the circuit includes a power side voltage signal, generally shown at V and a ground side G. A resistor $R_1$ is connected to the solenoid $R_s$. A transistor switch Q is provided between the solenoid $R_s$ and the resistor $R_1$. The circuit is fed by pulse width modulated signal 12 for control of the actuation of the solenoid $R_s$.

Figure 3:
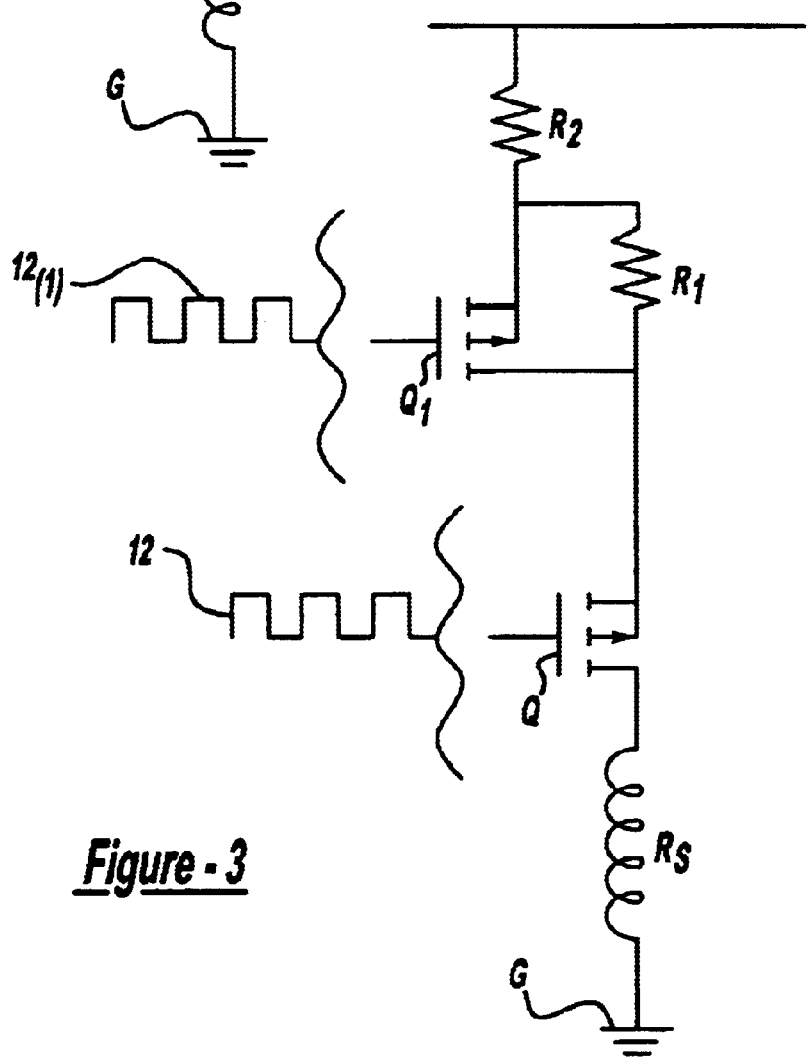
FIG. 3 is a schematic of a power driver for a dual gain solenoid using a pair of resistors in series with a transistor for providing further control to the driver solenoid.

Referring now to FIG. 3, a second series resistor $R_2$ has been added to the circuit of FIG. 2. Additionally, a second transistor $Q_1$ is used for controlling the resistors used for control of the voltage to the solenoid $R_s$. A second pulse width modulated signal 12 is also provided.

Figure 4:
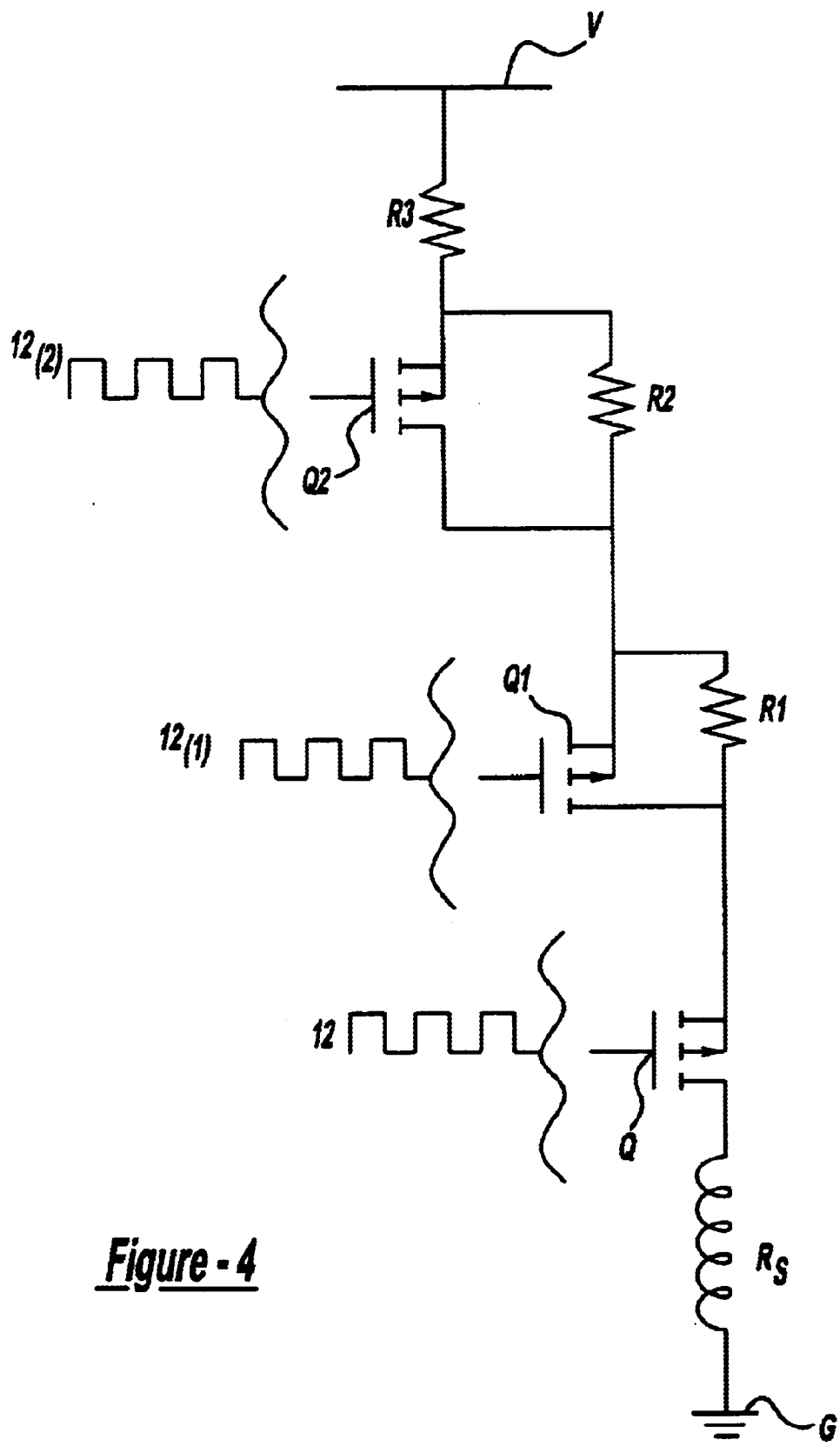
FIG. 4 is a schematic of a multiple gain solenoid wherein a plurality of resistors are configured in series with multiple transistors for selecting or deselecting resistors when desiring finite control of the driver circuit.

FIG. 4 shows an alternate embodiment with a third resistor $R_3$ in series with $R_2$ and $R_1$, and another transistor $Q_2$, used for switching between the resistors for prowling of the solenoid $R_s$.

PWM type drivers typically provide the power circuit through a transistor in series with resistor(s) and with diodes and capacitors added to protect against flyback voltages, etc. Often times a sensing resistor is one of the series resistance's. Other components are typically added to the circuit to make the circuit functional and stabile through out its requires operating range. The power circuit is driven by a PWM logic circuit. (FIG. 1) For this discussion, the power circuit is to be simplified into 3 basic elements.

1. Series resistances—R
2. Transistor (Often a FET)—$Q_1$
3. Solenoid resistance.—$R_s$ Other variables include Vign—Supply voltage I—Current Voltage drop equation for the simplified circuit is given by equation (1)

$$Vign=(R+R_s)*I+V(Q_1) \qquad (1)$$

Assume V ($Q_1$) negligible. Equation (1) becomes $$I=(Vign)/(R+R_s) \qquad (2)$$

Current to the solenoid becomes a function of Vign, R and $R_s$. Consider Vign and $R_s$ to be constant. Current then becomes dependent on the series resistance R. R can be broken into any number of components. Let's consider $R_1$, $R_2$ and $R_3$.

$$R=R_1+R_2+R_3 \qquad (3)$$

Consider R1 to be a resistance that does not vary. Consider $R_2$ and $R_3$ to be selectable. Equation (2) becomes $$I=(Vign)/((R_1+R_2+R_3)+R_s) \qquad (4)$$

When all resistance are selected.
I could also be $$I=(Vign)/(R_1+R_s) \qquad (5)$$

With no resistances selected or $$I=(Vign)/((R_1+R_2)+R_s) \qquad (6)$$

With $R_2$ selected

The same argument would hold for $R_3$ selection.

Full gain (maximum current/minimum accuracy) would be achieved not selecting $R_2$ or $R_3$. Minimum gain (maximum accuracy) would be achieved by selecting $R_2$ and $R_3$. Intermediate gains could be achieved by selecting $R_2$ or $R_3$.

Electronic Implementation

As set forth above, FIG. 2 is the baseline simplified power circuit, single series resistor. FIG. 3 and FIG. 4 are simplified circuit that will allow for multiple gains. The basic approach is to add additional power transistors/resistor pairs in series with the main power transistor. The series pairs would act as direct shorts when energized effectively removing the series resistor $R_2$ and/or $R_3$. A conditioned logic signal would drive each transistor/resistor pairs.

Another way to implement would be to add a parallel resistor/transistor pair with the solenoid.

A combination approach with parallel and series could be used as well. The combined approach is defined by the equation (7)

$$Is=Vign/(R_s+R+(RR_s/R_p)) \qquad (7)$$

Vign—Supply voltage
Is—Current through solenoid
$R_s$—Solenoid resistance
R—Series resistance
$R_p$—Parallel resistance Series transistor/resistor pairs have one advantage over a parallel pair. The maximum power consumption is at full gain. The parallel approach has the minimum power consumption at full gain.

Further understanding of the present invention will be realized by referring to the additional materials appended herewith. Those skilled in the art can now appreciate from the foregoing description that the broad teachings of the present invention can be implemented in a variety of forms. Therefore, while this invention has been described in connection with particular examples thereof, the true scope of the invention should not be so limited, since other modifications will become apparent to the skilled practitioner upon a study of the drawings, specification and following claims.

What is claimed is:

1. A method of controlling a proportional solenoid having a single coil, the method including the steps of:

providing a control signal having a predetermined number of control/stepped levels;

providing a full gain range between a minimum gain and a maximum gain for selectively powering the solenoid at any one of a preset number of gain levels within the full gain range;

selectively reducing the full gain range to a partial gain range less than the full gain range for selectively powering the solenoid at any one of a present number of gain levels within the partial gain range;

selecting one of the full gain range in a first mode or the partial gain range in a second mode; and producing a power signal to the coil based on the control signal, the power signal being either one of the preset number of gain levels in the full range in the first mode or one of the preset number of gains in the partial gain range, whereby the preset number of gains is the same in the first mode and second mode, so that the gain levels in the second mode provide a higher resolution than in the first mode.

2. A proportional system for controlling an actuator for receiving a control signal from a controller, the control signal having a predetermined number of control/stepped levels, said system including:

a single coil solenoid operatively controlling the actuator in response to a power signal;

a gain divider circuit for providing a full gain range between a minimum gain and a maximum gain for selectively powering the solenoid at any one of a preset number of gain levels within the full gain range;

selectively reducing the full gain range to a partial gain range less than the full gain range for selectively powering the solenoid at any one of a present number of gain levels within the partial gain range, and for receiving a select signal for selecting one of the full gain range in a first mode or the partial gain range in a second mode; and a power circuit for producing a power signal to the coil based on the control signal, the power signal being either one of the preset number of gain levels in the full range in the first mode or one of the present number of gains in the partial gain range, whereby the preset number of gains is the same in the first mode and second mode, so that the gain levels in the second mode provide a higher resolution than in the first mode.

3. A system as set forth in claim 2 wherein said predetermined number of control/stepped levels equals said preset number of gain levels.

4. A system as set forth in claim 2 wherein said gain divider circuit includes a switch and gain reducer, wherein said switch is set in a first state to connect said gain reducer to the power circuit to limit the gain to less than maximum.

5. A system as set forth in claim 4 wherein said switch is a transistor and said gain reducer is a resistor, wherein said transistor is set in a first state to connect said resistor to the power circuit to limit the gain to less than maximum.

6. A system as set forth in claim 5 wherein said gain divider circuit includes a parallel switch and resistor in series with said power circuit.

7. A system as set forth in claim 5 wherein said gain divider circuit includes a series switch and resistor in parallel with the power circuit.

8. A variable force solenoid system for high and low pressure control of a transmission clutch which receives a control signal having a predetermined number of stepped levels to drive a coil of the solenoid system at a preset number of gain levels within a full gain range between minimum and maximum gains, said system comprising:

a single coil solenoid operatively controlling the transmission clutch for receiving a power signal within the full gain range; and an adjustment circuit for receiving the control signal and for increasing the number of present gain levels to greater than the number of stepped levels within at least a portion of the gain range for low pressure control, so that higher resolution of gain can be selected for low pressure control of the transmission clutch.

9. A system as set forth in claim 8 wherein said adjustment circuit includes a gain divider circuit for receiving a select signal and for selectively reducing the full gain range to a partial gain range less than the full gain range in a second mode, to selectively power the coil at any one of the present number of gain levels within the partial gain range and for allowing power to the coil at any one of the present number of gain levels within the full gain range in a first mode.

10. A system as set forth in claim 8 wherein said adjustment circuit includes a power circuit for receiving said control signal and producing a power signal to the coil based on the control signal, the power signal being either one of the preset number of gain levels in the full range in the first mode or one of the present number of gains in the partial gain range, whereby the preset number of gains is the same in the first mode and second mode, so that the gain levels in the second mode provide a higher resolution than in the first mode.

11. A system as set forth in claim 8 wherein said adjustment circuit includes an extended bit/level circuit for adding levels to said preset number of gain levels to increase the resolution within said adjustment circuit.

* * * * *